US012789655B2

(12) United States Patent
Fuehrer

(10) Patent No.: US 12,789,655 B2
(45) Date of Patent: Nov. 10, 2026

(54) PLUG-IN CONNECTOR PART FOR A CHARGING SYSTEM FOR CHARGING AN ELECTRIC VEHICLE

(71) Applicant: PHOENIX CONTACT E-Mobility GmbH, Schieder-Schwalenberg (DE)

(72) Inventor: Thomas Fuehrer, Blomberg (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 342 days.

(21) Appl. No.: 18/730,350

(22) PCT Filed: Jan. 9, 2023

(86) PCT No.: PCT/EP2023/050330
§ 371 (c)(1),
(2) Date: Jul. 19, 2024

(87) PCT Pub. No.: WO2023/138936
PCT Pub. Date: Jul. 27, 2023

(65) Prior Publication Data
US 2025/0074220 A1 Mar. 6, 2025

(30) Foreign Application Priority Data
Jan. 24, 2022 (BE) .................................. 2022/5042

(51) Int. Cl.
*B60L 53/16* (2019.01)

(52) U.S. Cl.
CPC .................................. *B60L 53/16* (2019.02)

(58) Field of Classification Search
CPC ..................................................... B60L 53/16
(Continued)

(56) References Cited

U.S. PATENT DOCUMENTS 7,922,518 B1 * 4/2011 Takehara ........... H01R 13/5202 439/485
2015/0050830 A1 * 2/2015 Debabrata .......... H01R 12/7088 439/485
(Continued)

FOREIGN PATENT DOCUMENTS

CN 202869309 U 4/2013
DE 102016105361 A1 9/2017
(Continued)

*Primary Examiner* — Gary F Paumen
(74) *Attorney, Agent, or Firm* — LEYDIG, VOIT & MAYER, LTD.

(57) ABSTRACT

A plug-in connector part for a charging system for charging an electric vehicle includes: a plug-in portion for plug-in connection to a mating plug-in connector part; at least one plug-in contact, arranged on the plug-in portion, for electrical contact with a mating contact element of the mating plug-in connector part; a connecting element for connecting an electrical load line to the at least one plug-in contact; and a contact body to which the at least one plug-in contact and the connecting element are connected, the contact body transmitting a current between the connecting element and the at least one plug-in contact. The contact body has a core including a first electrically conductive material and a cladding layer which covers at least portions of the core and includes a second electrically conductive material that is different than the first electrically conductive material.

17 Claims, 11 Drawing Sheets

(58) Field of Classification Search
USPC ........................................ 439/801, 485, 487
See application file for complete search history.

(56) References Cited

U.S. PATENT DOCUMENTS

| | | | | |
|---|---|---|---|---|
| 2015/0087181 | A1* | 3/2015 | Manahan | H01R 13/53 439/487 |
| 2018/0097316 | A1 | 4/2018 | Rose et al. | |
| 2020/0067237 | A1* | 2/2020 | Sarraf | H01R 13/6683 |
| 2021/0399503 | A1* | 12/2021 | Zabeck | H01R 13/6683 |
| 2021/0399510 | A1* | 12/2021 | Heiss | B60L 53/16 |

FOREIGN PATENT DOCUMENTS

| | | | |
|---|---|---|---|
| DE | 202018006166 | U1 | 5/2019 |
| DE | 102020102219 | A1 | 8/2021 |
| JP | 2003297656 | A | 10/2003 |
| WO | WO 2016169940 | A1 | 10/2016 |

* cited by examiner

PLUG-IN CONNECTOR PART FOR A CHARGING SYSTEM FOR CHARGING AN ELECTRIC VEHICLE

CROSS-REFERENCE TO PRIOR APPLICATIONS

This application is a U.S. National Phase application under 35 U.S.C. § 371 of International Application No. PCT/EP2023/050330, filed on Jan. 9, 2023, and claims benefit to Belgian Patent Application No. BE 2022/5042, filed on Jan. 24, 2022. The International Application was published in German on Jul. 27, 2023 as WO/2023/138936 under PCT Article 21(2).

FIELD

The invention relates to a plug-in connector part for a charging system for charging an electric vehicle, and to a charging system for charging an electric vehicle.

BACKGROUND

Such a plug-in connector part comprises a plug-in portion for plug-in connection to a mating plug-in connector part; at least one plug-in contact, arranged on the plug-in portion, for electrical contact with a mating contact element of the mating plug-in connector part; and a connecting element for connecting an electrical load line to the at least one plug-in contact.

Such a plug-in connector part can in particular be designed as a charging socket and be arranged on an electric vehicle. A mating plug-in connector part in the form of a charging plug arranged on a charging cable can be connected to such a charging socket in order in this way to establish an electrical connection between a charging station and the electric vehicle and to electrically charge the electric vehicle.

In the field of electromobility, it is desirable to charge electric vehicles quickly and efficiently in order to reduce charging times and associated trip interruption times. In order to enable rapid charging of an electric vehicle within the context of a rapid charging process, high charging capacities are used, combined with large charging currents, for example with a current of 700 A or even higher.

The arrangement and dimensioning of electrical contact elements on plug-in connector parts for charging an electric vehicle are usually stipulated normatively. Contact geometries on such plug-in connector parts therefore cannot be easily scaled in order to possibly achieve a larger current-carrying capacity at the contact elements. A challenge is therefore to facilitate the greatest possible power transfer with existing contact geometries.

When large charging currents are transmitted, heating at the contact elements and other components of the plug-in connector part occurs. It is stipulated in this respect that heating at a plug-in connector part must not exceed 50 K. If large charging currents are used, care must therefore be taken to ensure that excess heating at the plug-in connector part does not occur.

In the case of a plug-in connector part in the form of a charging socket on an electric vehicle, heating due to current transmission usually only occurs intermittently, i.e., during a charging process for charging the electric vehicle, but not in a longer period of time before and after. After a charging process, there is usually a comparatively long period without current transmission, during which the plug-in connector part can cool down again.

This is in contrast to a plug-in connector part in the form of a charging plug on a charging device, which may be used in continuous operation for a large number of consecutive charging processes for charging a large number of electric vehicles.

For example, a rapid charging process can last between 10 minutes and 30 minutes. On the sides of a plug-in connector part in the form of a charging socket on an electric vehicle, it must be ensured that heating at the plug-in connector part does not exceed a maximum permissible temperature increase within this charging time. This can be achieved, for example, by designing the plug-in connector part to be thermally inert, so that a temperature rise at the plug-in connector part is delayed and a normatively permitted limit temperature is thus not reached during the charging process.

The thermal inertia can be increased, for example, by providing additional heat capacities at the plug-in connector part. For this purpose, it is known from DE 10 2016 105 308 A1 to provide heat capacity elements at contact elements of a plug-in connector part, which heat capacity elements can, for example, comprise a phase change material and can thus efficiently absorb a comparatively large amount of heat during a charging process.

SUMMARY

In an embodiment, the present invention provides a plug-in connector part for a charging system for charging an electric vehicle, the plug-in connector part comprising: a plug-in portion for plug-in connection to a mating plug-in connector part; at least one plug-in contact, arranged on the plug-in portion, for electrical contact with a mating contact element of the mating plug-in connector part; a connecting element configured to connect an electrical load line to the at least one plug-in contact; and a contact body to which the at least one plug-in contact and the connecting element are connected, the contact body being configured to transmit a current between the connecting element and the at least one plug-in contact, wherein the contact body has a core comprising a first electrically conductive material and a cladding layer which covers at least portions of the core and comprises a second electrically conductive material that is different than the first electrically conductive material.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
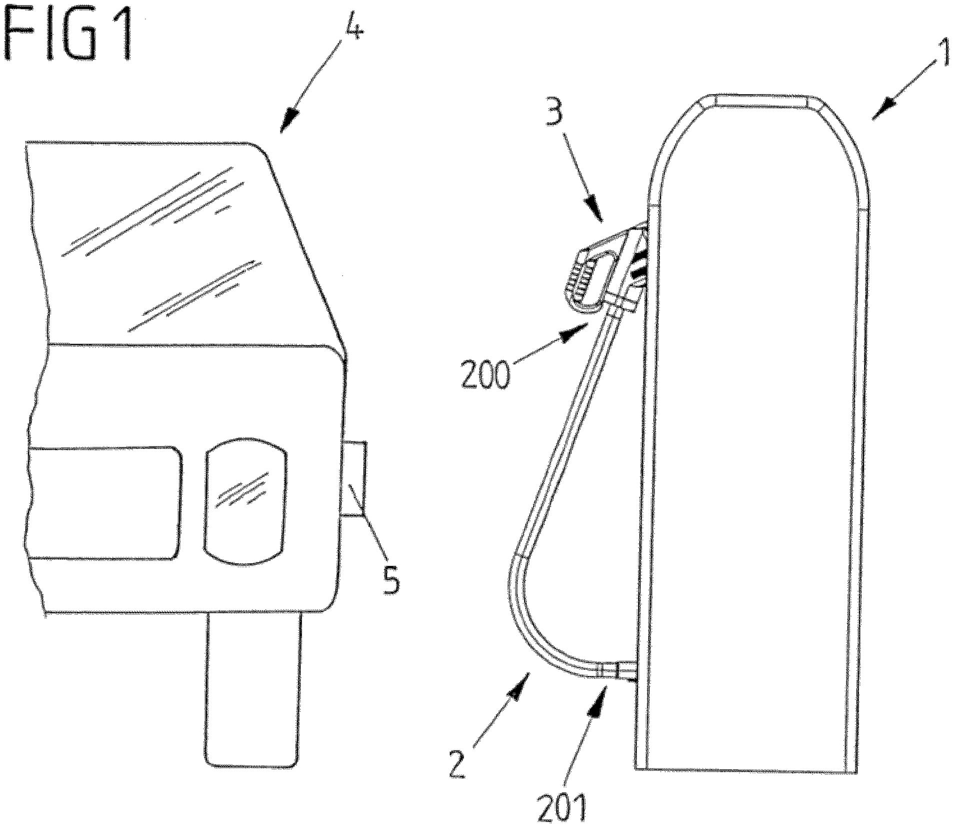
FIG. 1 is a view of a charging station having a charging cable arranged thereon for connecting to an electric vehicle.

In an embodiment, the present invention provides a plug-in connector part which can provide in a cost-effective and weight-saving manner a high heat capacity at a plug-in connector part for delayed heating during a charging process.

Accordingly, the plug-in connector part comprises a contact body to which the at least one plug-in contact and the connecting element are connected and which is designed to transmit a current between the connecting element and the at least one plug-in contact, wherein the contact body has a core made of a first electrically conductive material and a cladding layer which covers at least portions of the core and is made of a second electrically conductive material that is different from the first electrically conductive material.

The plug-in connector part comprises one or more plug-in contacts which, when the plug-in connector part is connected in a plug-in manner to an associated mating plug-in connector part, come into plug-in engagement with a respectively associated mating contact element of the mating plug-in connector part and thus establish an electrical contact between the plug-in connector part and the mating plug-in connector part. The plug-in contacts can, for example, each be designed to transmit a charging current in the form of a direct current, wherein each plug-in contact is electrically connected to a connecting element to which a load line for transmitting the charging current is connected when the plug-in connector part is in the normal operating state.

A contact body, which serves to transmit a current between the connecting element and the plug-in contact, is arranged between the connecting element and the plug-in contact. Firstly, the contact body is electrically conductive and thus transmits the charging current. Secondly, the contact body has a heat capacity so that heat at the contact body can be absorbed and stored.

For this purpose, the contact body has a core made of a first electrically conductive material and a cladding layer which covers at least portions of the core and is made of a second electrically conductive material that is different from the first electrically conductive material. Since the contact body is made of different materials, the contact body can firstly be optimized for favorable electrical contact with the connecting element on the one hand and the plug-in contact on the other hand. For this purpose, the cladding layer is preferably made of a material with particularly good electrical conductivity so that an electrical contact can be established with the connecting element on the one hand and the plug-in contact on the other hand via the cladding layer. Secondly, the material of the core can provide a high heat capacity at the contact body so that heat at the contact body can be absorbed and stored and, by using the contact body, the thermal inertia of the plug-in connector part during heating is thus increased.

The core may, for example, be made of an aluminum material, for example of pure aluminum or an aluminum alloy.

In contrast, the cladding layer can, for example, be manufactured from a copper material, for example pure copper or a copper alloy.

The cladding layer can, for example, be applied as a plated layer to the core, for example by roll plating, for example by cold rolling or hot rolling, or by other plating methods suitable for a particular material pairing.

The layer thickness of the cladding layer may, for example, be between 0.5 mm and 3 mm, for example between 1 mm and 2 mm.

By making the core out of aluminum, the contact body as a whole can be manufactured to be lightweight and cost-effective. Aluminum usually has a high thermal conductivity and also good electrical conductivity as well as a high specific heat capacity so that heat can be absorbed and stored via the core.

In the case of a body made of an aluminum material, it may not be easy to establish electrical contact because an oxide layer that has an electrically insulating effect usually forms on an exposed surface of the aluminum body. This is counteracted in the core of the contact body by the cladding layer, which is attached to the outside of the core of the contact body and, by being made of a material with good electrical conductivity, in particular a copper material, can establish a simple and advantageous electrical contact with the connecting element on the one hand and with the plug-in contact on the other hand.

In one embodiment, the cladding layer can additionally be coated with a further material layer, for example a silver layer, in order to further improve electrical contact between the plug-in contact and/or the connecting element and the cladding layer.

In one embodiment, the connecting element comprises an abutting element, which abuts flatly on the cladding layer and is thus in electrical contact with the cladding layer. The connecting element can, for example, be designed as a cable lug, which, with the abutting element, abuts flatly on the cladding layer and thus on the contact body and is fastened to the contact body via the abutting element. The connecting element also comprises a connecting piece, for example in the form of a sleeve, into which an associated load line can be inserted and via which the load line can be connected to the connecting element, for example by crimping or by soldering.

The connecting element is connected to the contact body via the abutting element in that the abutting element abuts on the cladding layer and is fastened to the contact body. For fastening, the connecting element comprises, for example, a fastening element, for example in the form of a screw or a rivet, via which a screw connection or rivet connection is established between the connecting element and the contact body. For example, a through-opening (without an internal thread) can be formed on the abutting element, through which through-opening a fastening element in the form of a screw is inserted and screwed into a thread on the contact body, preferably in the core of the contact body.

The attachment location of the connecting element on the contact body and the attachment location of the plug-in contact on the contact body are preferably spatially separated from one another. The connecting element is thus attached to the contact body, and the plug-in contact is likewise attached to the contact body. The contact body thus occupies an intermediate position between the connecting element and the plug-in contact so that a current flow between the plug-in contact and the connecting element is conducted via the contact body.

In one embodiment, the plug-in contact is connected to the contact body via a positive connection and/or a material connection. A positive connection may, for example, be established via a rivet connection. In contrast, a material connection may, for example, be established by a welded or soldered connection. A positive connection can be used to achieve a mechanically firm hold of the plug-in contact on the contact body. In particular, a small electrical transition resistance can be produced between the plug-in contact and the contact body via the material connection, which is preferably formed between the plug-in contact and the cladding layer.

In one embodiment, the plug-in contact comprises a contact portion for establishing an electrically contacting plug-in connection to an associated mating contact element of a mating plug-in connector part. The contact portion can, for example, have the shape of a contact pin or the shape of a contact socket. The mating contact element is correspondingly complementary in shape and has the shape of a contact socket or a contact pin. When the plug-in connector part is connected to the mating plug-in connector part, the plug-in contact is connected in a plug-in manner to the associated mating contact element via the contact portion so that an electrical connection is established.

In one embodiment, the contact portion is arranged on a first side of the contact body, while the connecting element is arranged on a second side of the contact body that faces away from the first side. The contact portion of the plug-in contact and the connecting element are thus located on different, opposite sides of the contact body.

In one embodiment, the contact portion extends perpendicularly from the first side. The contact portion extends into the region of the plug-in portion of the plug-in connector part so that a plug-in, electrically contacting connection to the associated mating contact element of the mating plug-in connector part can be established via the contact portion when the plug-in connector part is connected to the mating plug-in connector part.

In order to connect the plug-in contact to the contact body in a positive manner, the plug-in contact can, for example, comprise a shaft portion adjoining the contact portion, which shaft portion is, for example, radially tapered in comparison to the contact portion and is inserted into an opening in the contact body. The opening can extend as a blind hole in the contact body but can alternatively also be designed as a through-opening that extends completely through the contact body. If the opening is designed as a through-opening, the shaft portion can, for example, extend along the through-opening through the contact body so that an end of the shaft portion that is remote from the contact portion projects from the contact body and can be plastically deformed to produce a rivet connection in order in this way to fix the plug-in contact to the contact body in a positive manner.

In such a positive connection, a material connection, for example in the form of a welded or soldered connection, can additionally be provided in order to reduce the electrical transition resistance between the plug-in contact and the contact body.

If no positive connection is to be provided between the plug-in contact and the contact body, the contact portion (which is in this case not adjoined by an additional shaft portion) can be butt-fitted to the contact body and connected to the contact body via a material connection, for example a welded or soldered connection.

A charging system for charging an electric vehicle includes a plug-in connector part of the type described above. Such a charging system also includes a mating plug-in connector part that can be plugged into the plug-in connector part. The plug-in connector part may, for example, be arranged as a charging socket on the electric vehicle. In contrast, the mating plug-in connector part can be formed as a charging socket on the electric vehicle, for example, which is arranged on a charging cable and can be connected to the plug-in connector part in the form of the charging plug. The charging plug can, for example, be connected to a charging station via the charging cable so that charging currents can be transmitted from the charging station to the electric vehicle when the plug-in connector part and the mating plug-in connector part are in the connected position.

A plug-in connector part of the type described here can in particular be used for transmitting charging currents in the form of direct currents. However, such a plug-in connector part can also serve to transmit charging currents in the form of alternating currents.

FIG. 1 shows a charging system comprising a charging station 1 which is used to charge an electrically powered vehicle 4, also referred to as an electric vehicle. The charging station 1 is designed to provide a charging current in the form of an alternating current or a direct current and has a cable 2 that is connected at one end 201 to the charging station 1 and at another end 200 to a mating plug-in connector part 3 in the form of a charging plug.

Figure 2:
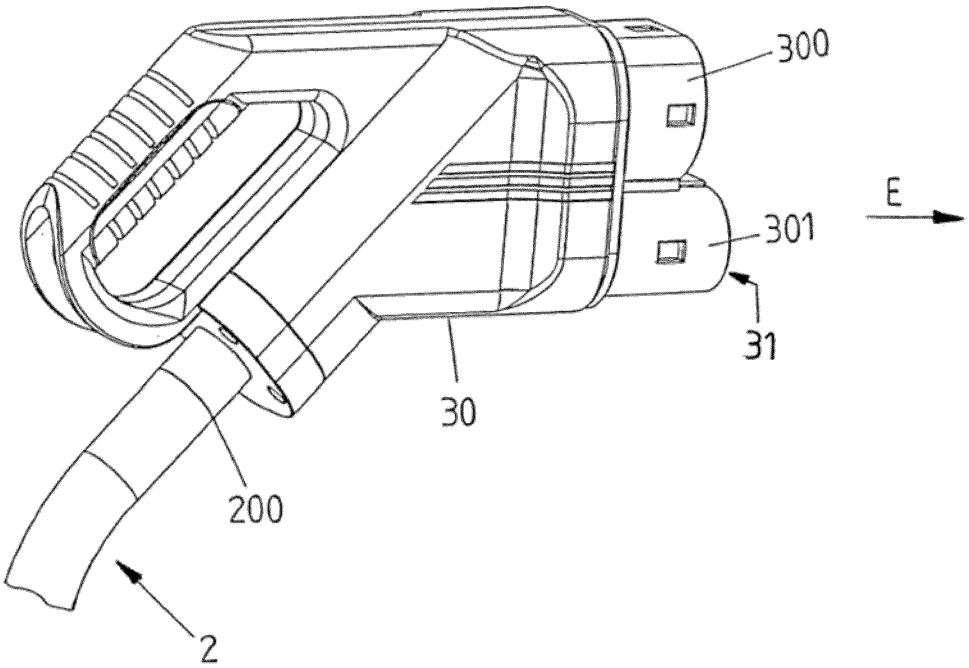
FIG. 2 is a view of a plug-in connector part in the form of a charging plug.

As the enlarged view according to FIG. 2 shows, the mating plug-in connector part 3 comprises plug-in portions 300, 301 on a housing 30, with which plug-in portions the mating plug-in connector part 3 can be brought into plug-in engagement with an associated plug-in connector part 5 in the form of a charging socket on the vehicle 4. In this way, the charging station I can be electrically connected to the vehicle 4 in order to transmit charging currents from the charging station 1 to the vehicle 4.

In order to make fast charging of the electric vehicle 4 possible, for example within the framework of a so-called rapid charging process, the transmitted charging currents have a high current intensity, for example higher than 500 A, possibly even in the order of magnitude of 700 A or more. As a result of such high charging currents, thermal losses occur at the cable 2 and also at the charging plug 3 as well as at the charging socket 5, which thermal losses can lead to heating of the cable 2, of the charging plug 3 and of the charging socket 5.

Permissible heating at components of the charging system is limited normatively, for example to a maximum value of 50 K. It follows that measures must be taken to prevent excessive heating during charging operation, in particular if high current intensities, for example in the order of magnitude of 700 A or more, are used.

While the charging cable 2 connected to the charging station 1 and the charging plug 3 arranged on said charging cable can usually be used in quasi-continuous operation with only short interruptions to carry out repeated charging processes on vehicles, an electric vehicle 4 is usually charged in a charging process lasting, for example, 10-30 minutes but is subsequently no longer supplied with current for a longer period of time so that the charging socket 5 on the vehicle 4 can cool down after the charging process. Different cooling measures, for example active cooling, are thus required on the charging cable 2 and the charging plug 3 than on the charging socket 5 arranged on the vehicle 4.

Heating at the charging socket 5 arranged on the electric vehicle 4 can, for example, be counteracted by increasing the thermal inertia at the charging socket 5, so that heating at the charging socket 5 during a charging process is slowed down. This can achieve that no excessive heating occurs during the charging process, but that the heating is slowed down so much, even at high current intensity, that a permissible limit temperature is not reached.

In an exemplary embodiment shown in FIG. 3-11 of a plug-in connector part 5 in the form of a charging socket to be arranged on an electric vehicle 4, plug-in portions 500, 501 are formed on a housing 50 and can be connected along the plug-in direction E to the plug-in portions 300, 301 of the mating plug-in connector part 3 in the form of the charging plug in order in this way to establish a mechanical plug-in connection between the charging plug 3 and the charging socket 5.

Contact elements 52 for transmitting an alternating current and also control contacts are arranged on an upper plug-in portion 500 of the plug-in connector part 5. In contrast, plug-in contacts 51A, 51B for transmitting a charging current in the form of a direct current are arranged on a lower plug-in portion 501.

The plug-in contacts 51A, 51B can, for example, be designed as pin contacts and, when the plug-in connector part 5 in the form of the charging socket is connected in a plug-in manner to the mating plug-in connector part 3 in the form of the charging plug, come into electrical engagement with associated mating contact elements 31 on the plug-in portion 301 so that an electrical connection is established between the plug-in connector part 5 and the mating plug-in connector part 3.

The plug-in contacts 51A, 51B are each connected to a load line 53A, 53B, which is inserted into the housing 50 and laid within the electric vehicle 4 for the purpose of carrying the charging current.

Figure 3:
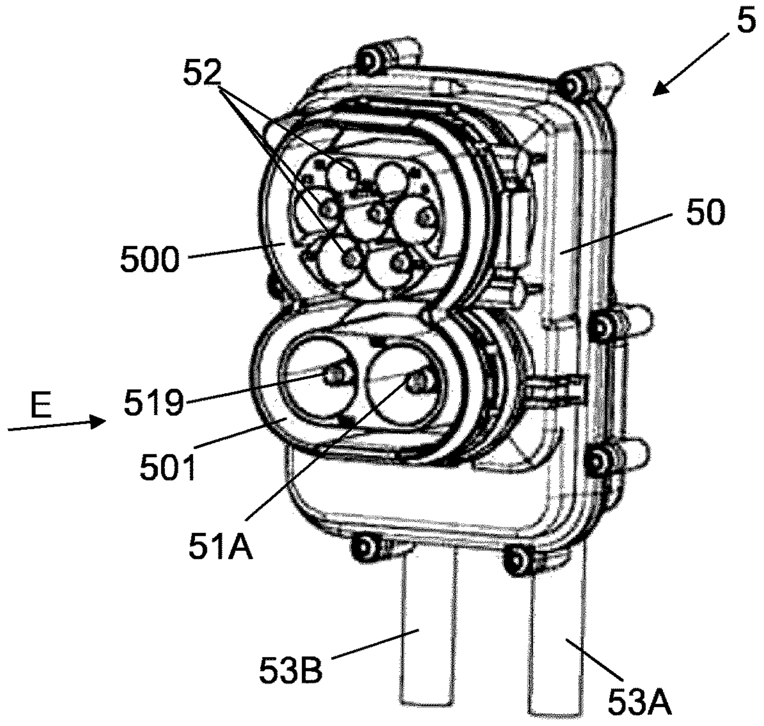
FIG. 3 is a view of an exemplary embodiment of a plug-in connector part in the form of a charging socket on an electric vehicle.
Figure 4:
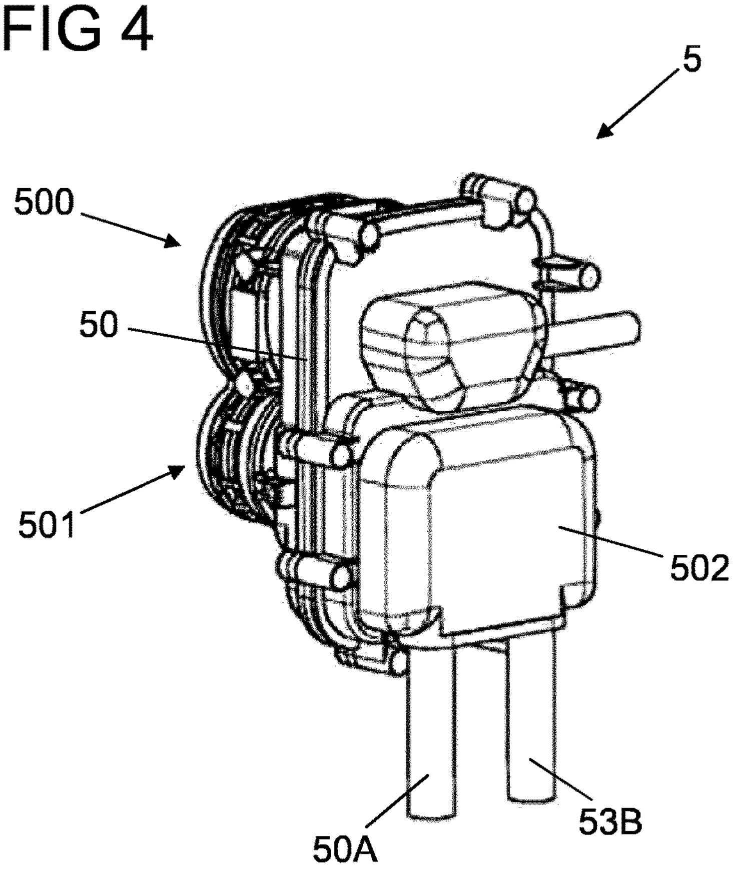
FIG. 4 is another view of the plug-in connector part.
Figure 5:
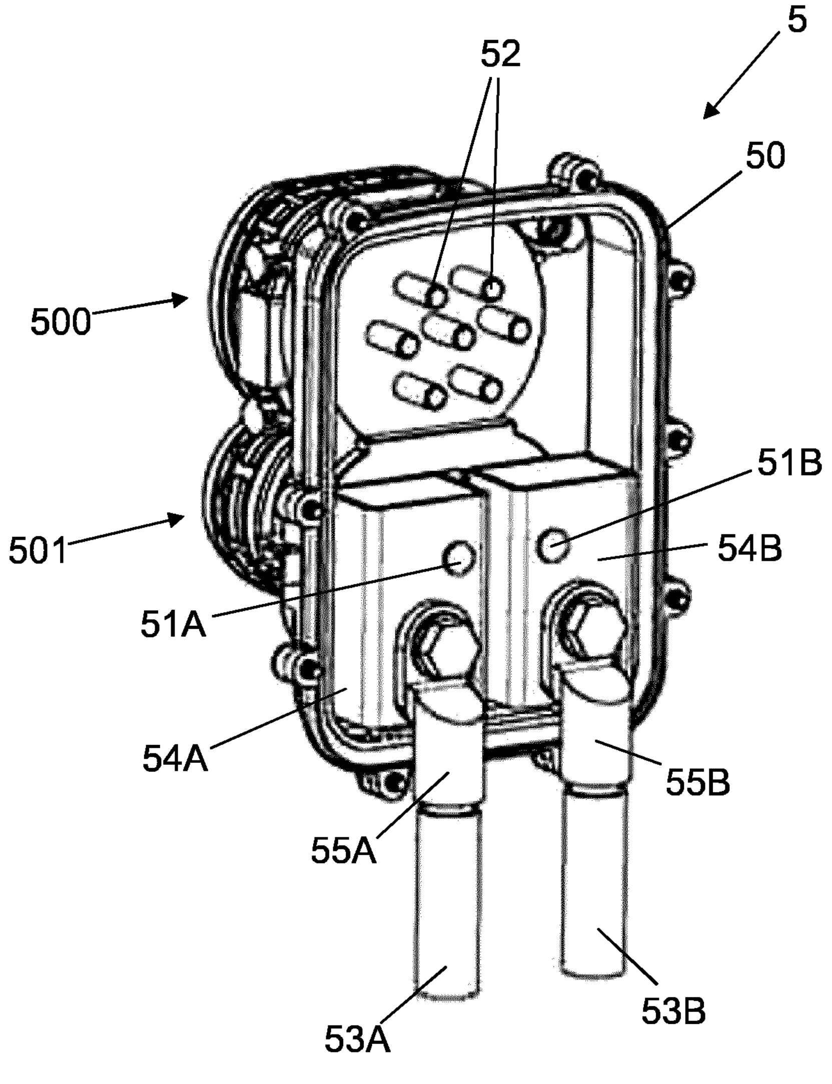
FIG. 5 is a view of the plug-in connector part without a rear cover.

While FIGS. 3 and 4 show the plug-in connector part 5 in the form of the charging socket in perspective views from the front and from the rear, FIG. 5 shows the plug-in connector part 5 without a rear cover 502 that faces away from the plug-in portions 500, 501. Visible inside the housing 50 are the contact elements 52 projecting into the region of the plug-in portion 500. Also visible are contact bodies 54A, 54B, which are associated with the plug-in contacts 51A, 51B and to which the load lines 53A, 53B are connected via connecting elements 55A, 55B in the form of cable lugs.

Figure 6:
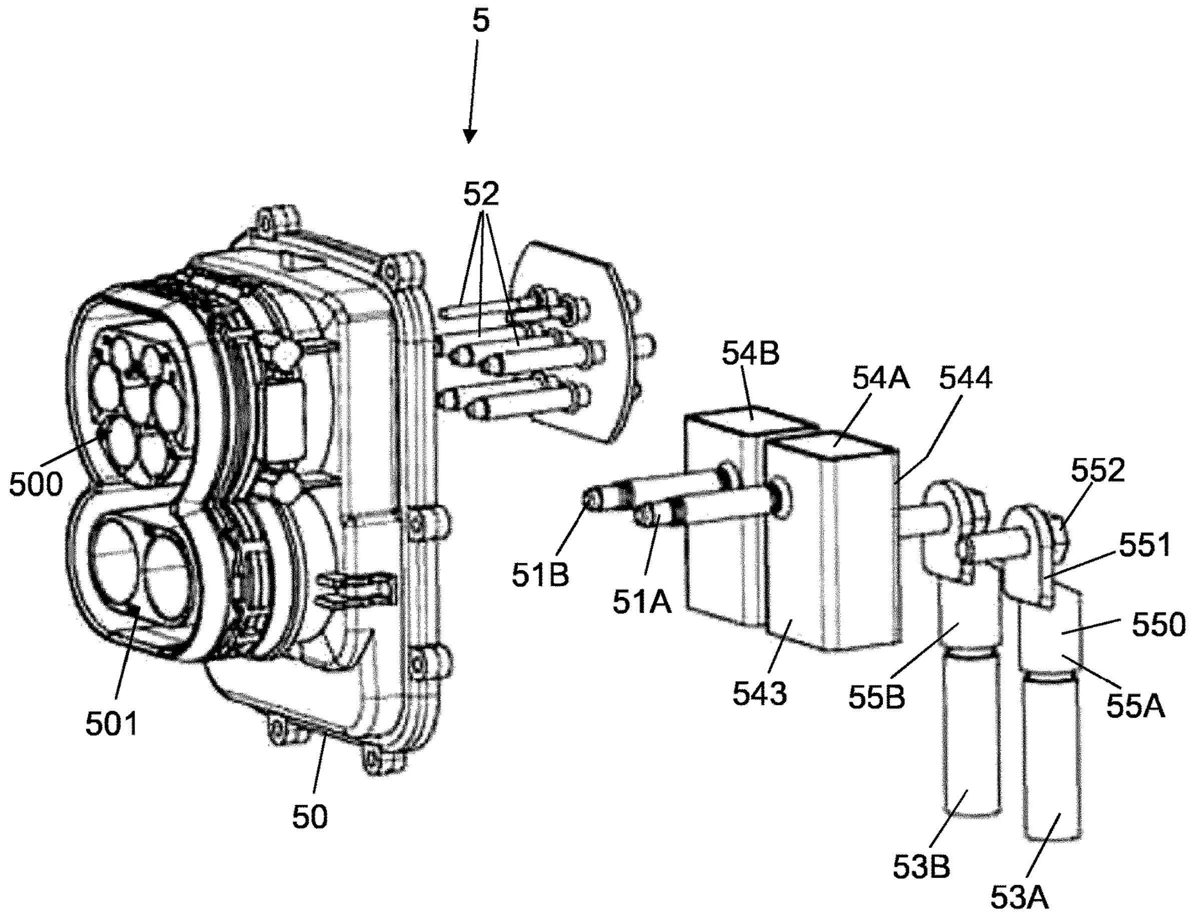
FIG. 6 is an exploded view of the plug-in connector part.
Figure 7:
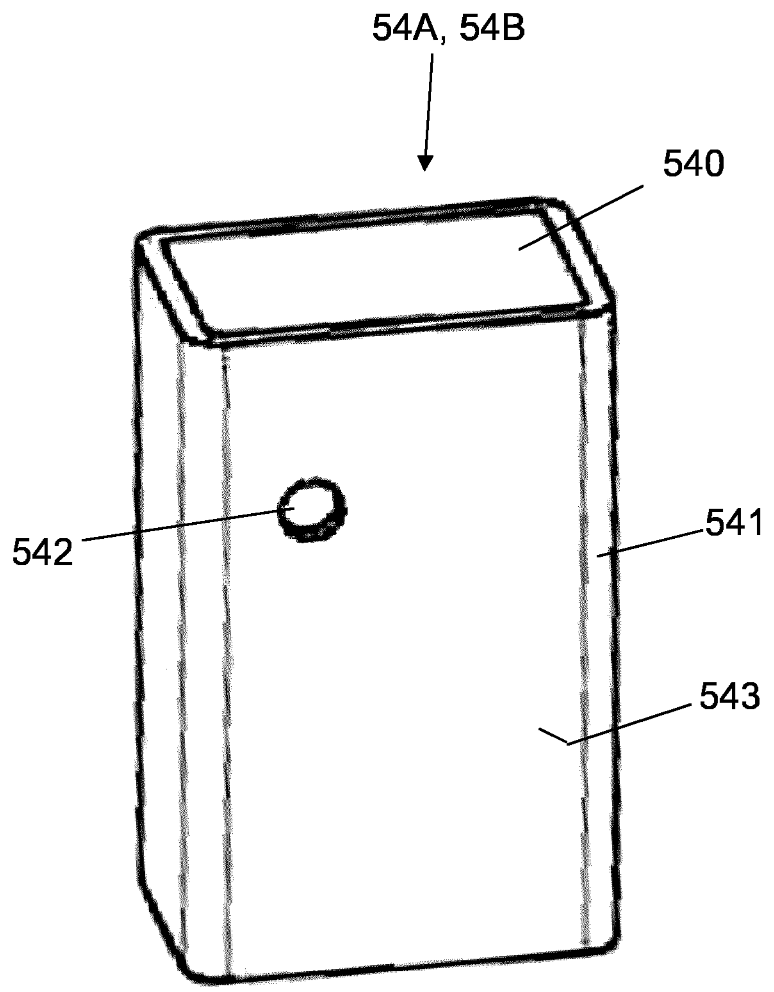
FIG. 7 is a view of a contact body of the plug-in connector part that is associated with a plug-in contact.
Figure 8:
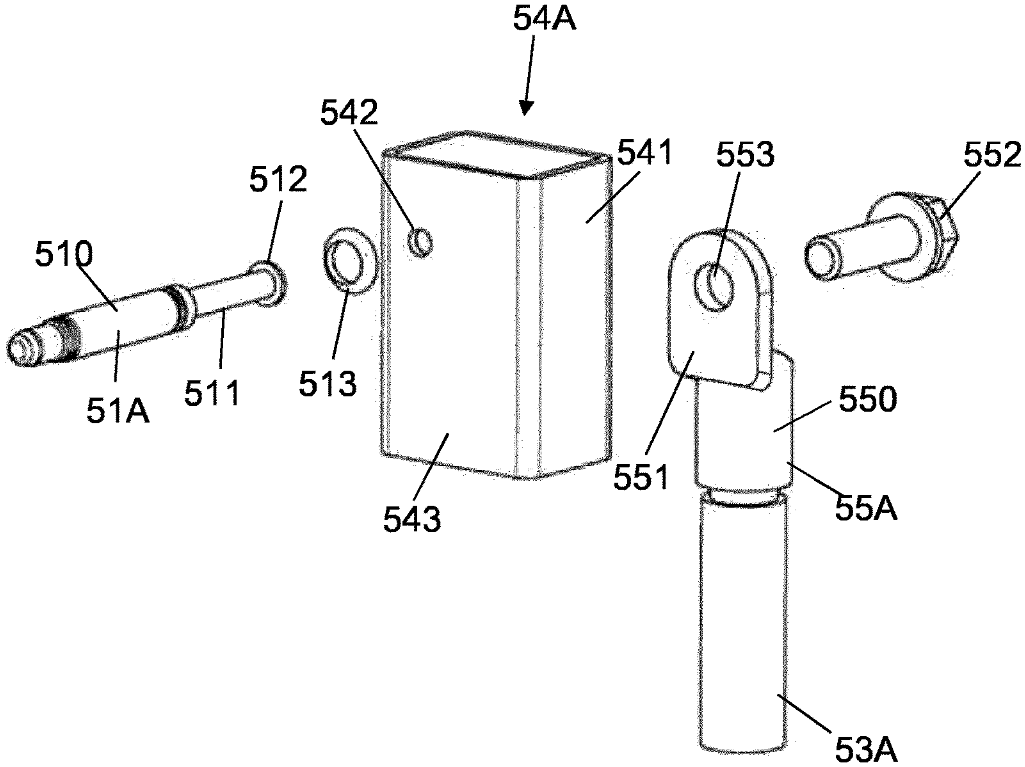
FIG. 8 is an exploded view of a plug-in contact with an associated contact body and a connecting element for connecting a load line.

As can be seen in FIG. 6 in conjunction with FIG. 7, a contact body 54A, 54B is associated with each plug-in contact 51A, 51B.

The plug-in contacts 51A, 51B are each arranged on a front side 543 of the associated contact body 54A, 54B and protrude perpendicularly on the front side 543 from the associated contact body 54A, 54B so that the plug-in contacts 51A, 51B project into the region of the lower plug-in portion 501 on the front side of the housing 50.

In contrast, the connecting elements 55A, 55B are each fastened to a rear side 544 of the respectively associated contact body 54A, 54B that faces away from the front side 543, so that the load lines 53A, 53B are connected to the respectively associated contact body 54A, 54B via the connecting elements 55A, 55B.

Each contact body 54A, 54B has a core 540 and a cladding layer 541 circumferentially surrounding the core, as can be seen in FIG. 7. The core 540 is formed from a first material, in particular an aluminum material. In contrast, the cladding layer 541 is formed from a second material that is different from the first material, for example a copper material.

The core 540 may be manufactured from pure aluminum or from an aluminum alloy. The cladding layer 541 may, for example, be formed from pure copper or from a copper alloy.

The cladding layer 541 is attached, for example as a plated layer, to the core 540, for example using a roll-plating method or another plating method suitable for a particular material pairing.

By manufacturing the core from an aluminum material, the contact body 54A, 54B can be produced to be cost-effective and lightweight.

While the core 540, in particular if manufactured from an aluminum material, is electrically conductive and can also have a high thermal conductivity and a high specific heat capacity, the cladding layer 541 on the outside of the core 540 can provide an advantageous electrical contact for the plug-in contact 51A, 51B and for the connecting element 55A, 55B. If the cladding layer 541 is manufactured from a copper material, the coating 541 has very good electrical conductivity so that the plug-in contact 51A, 51B on the one hand and the connecting element 55A, 55B on the other hand can be electrically contacted with the cladding layer 541 in a simple, reliable manner.

Without the cladding layer 541 on the core 540, an oxide layer, which could impair the electrical contact of the core 540, could form on the outside of the core 540, in particular if the core 540) is manufactured from aluminum. This is avoided by the cladding layer 541 which surrounds at least portions of the core 540).

An additional coating, for example made of silver, can be applied to the cladding layer 541 in order to further facilitate the electrical contact of the contact body 54A, 54B.

The contact body 54A, 54B is functionally arranged between the associated connecting element 55A, 55B and the associated plug-in contact 51A, 51B. During operation, the current between the connecting element 55A, 55B and the plug-in contact 51A, 51B is thus conducted via the contact body 54A, 54B. Due to the high specific heat capacity of the core 540) in particular, heat at the contact body 54A, 54B can be absorbed and stored so that, in this way, the thermal inertia of the system is increased and heating is at least slowed down.

In the exemplary embodiment according to FIG. 6, as can be seen in FIG. 8-11, the plug-in contact 51A. 51B is arranged in a positive and materially bonded manner on the respectively associated contact body 54A. 54B (in FIGS. 8 to 11, only one plug-in contact 51A is shown with the associated contact body 54A and the connecting element 55A; the assembly of the other plug-in contact 51B has a mirror-inverted but functionally identical structure).

Figure 9:
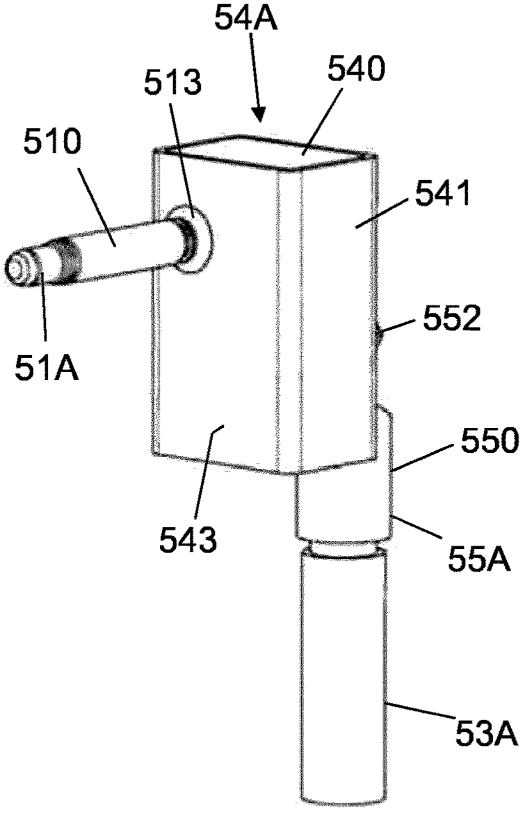
FIG. 9 shows the plug-in contact with the associated contact body and the connecting element in the assembled position.
Figure 10:
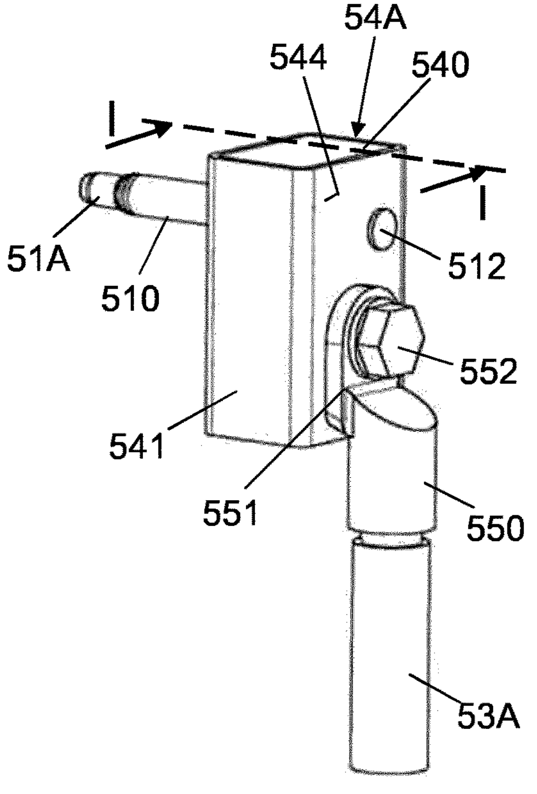
FIG. 10 is another view of the arrangement according to FIG. 9.
Figure 11:
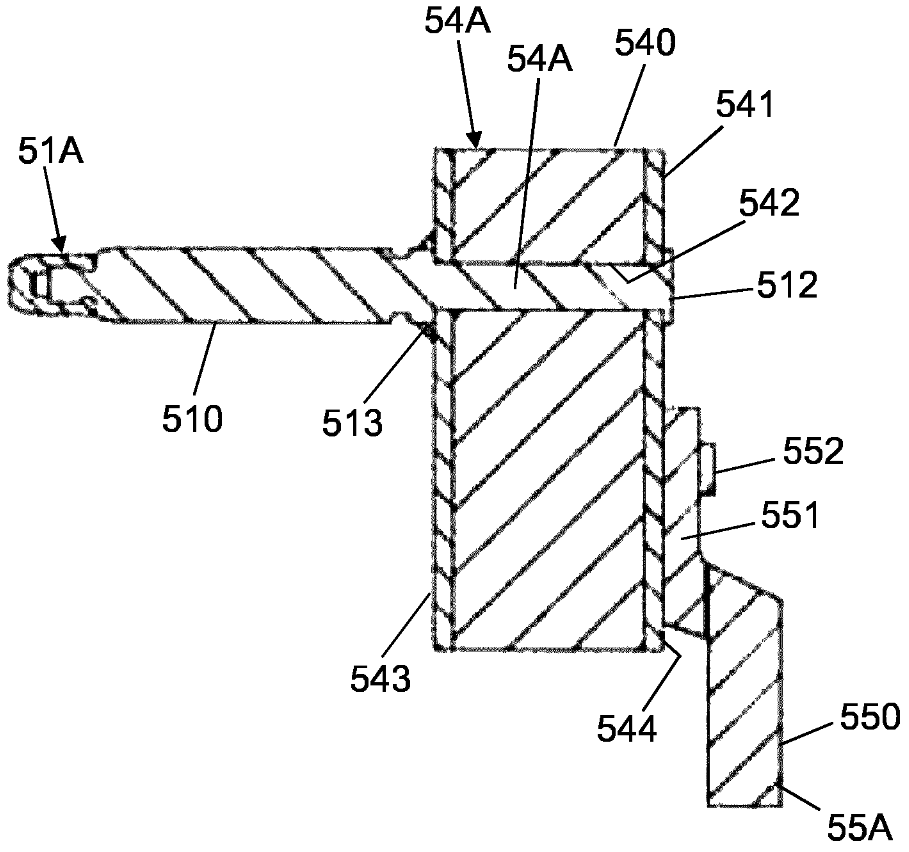
FIG. 11 is a sectional view along the line I-I according to FIG. 10.
Figure 12:
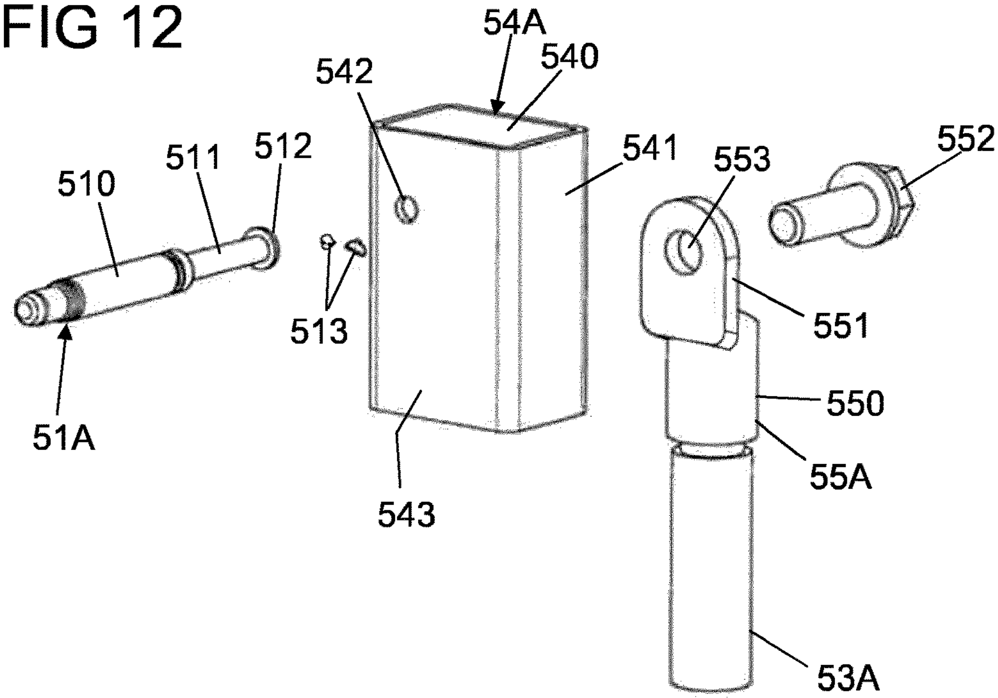
FIG. 12 is an exploded view of another exemplary embodiment of a plug-in contact with a contact body and a connecting element.
Figure 13:
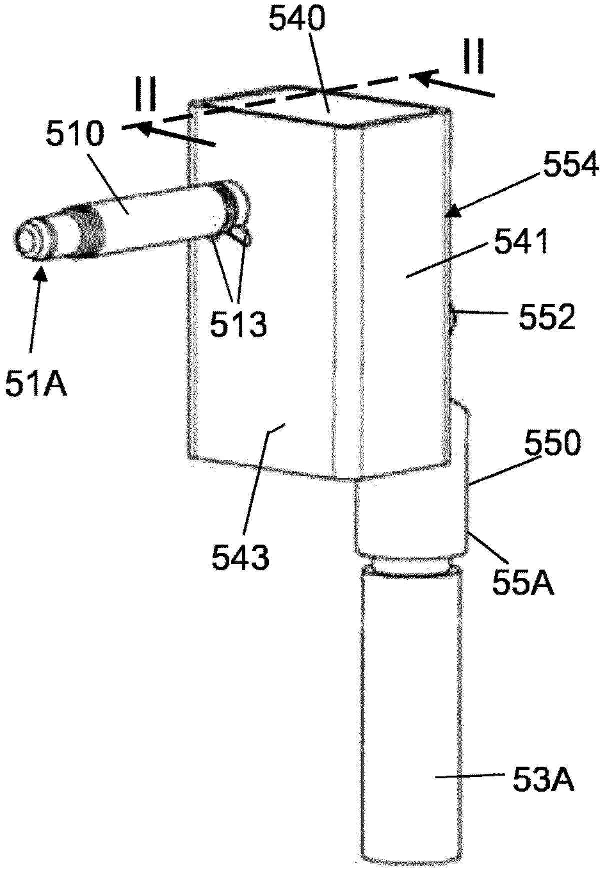
FIG. 13 shows the plug-in contact with the associated contact body and the connecting element in the assembled position.
Figure 14:
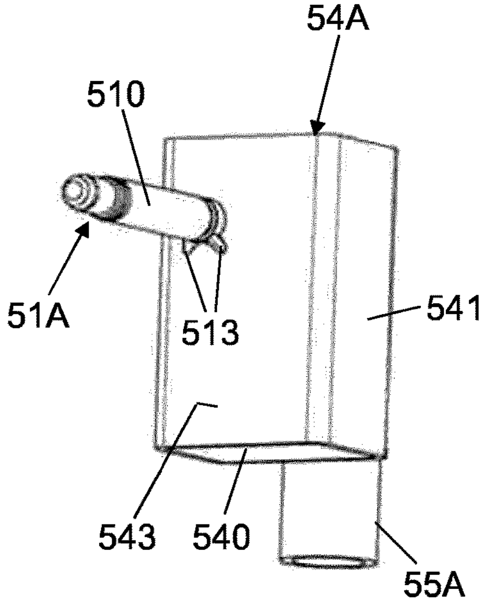
FIG. 14 is another view of the arrangement according to FIG. 13.
Figure 15:
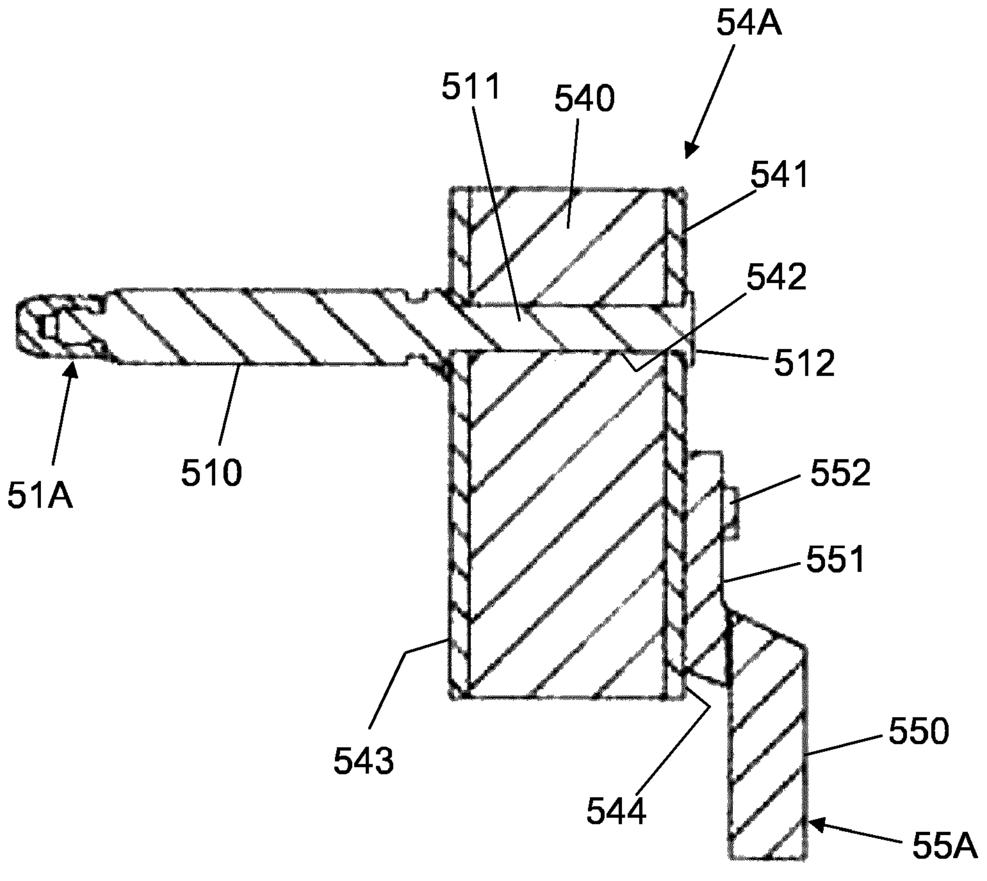
FIG. 15 is a sectional view along the line II-II according to FIG. 13.

In the exemplary embodiment shown, the plug-in contact 51A comprises a contact portion 510 which is formed as a contact pin and, when the plug-in contact 51A is mounted, protrudes perpendicularly from the front side 543 of the contact body 54A, as can be seen, for example, in FIG. 9. In the assembled position, the contact portion 510 projects into the region of the lower plug-in portion 501 and serves for electrical contact with an associated mating contact element when the plug-in connector part 5 is connected in a plug-in manner to the mating plug-in connector part 3.

The contact portion 510 is adjoined by a shaft portion 511, which is tapered in diameter in comparison to the contact portion 510 and lies in a through-opening 542 of the contact body 54A. One end 512 of the shaft portion 511 projects from the contact body 54A on the side facing away from the contact portion 510 and is plastically deformed so that a positive rivet connection is formed between the plug-in contact 51A and the contact body 54A.

Additionally, a materially bonded connection 513, for example a welded connection or a soldered connection, is formed between the contact portion 510 and the front side 543 of the contact body 54A. In the exemplary embodiment shown, the materially bonded connection 513 is formed circumferentially as a material ring at a transition between the contact portion 510 and the cladding layer 541 of the contact body 54A so that, via it, a materially bonded connection with good electrical contact is established between the contact portion 510 and the contact body 54A.

By positively connecting the plug-in contact 51A to the contact body 54A using the shaft portion 511, a mechanically loadable connection can be created between the plug-in contact 51A and the contact body 54A.

In contrast, by using a materially bonded connection 513, the electrical transition resistance between the plug-in contact 51A and the contact body 54A can be minimized.

While the contact portion 510 protrudes on the front side 543 of the contact body 54A, the connecting element 55A and, via it, the load line 53A are connected to the rear side 544 of the contact body 54A that faces away from the front side 543. The connecting element 55A is formed as a cable lug and comprises a connecting piece 550 in the form of a connecting sleeve, into which the load line 53A is inserted with a stripped conductor end and to which the load line 53A is connected. The connection between the connecting piece 550 and the load line 53A can, for example, be established via a soldered connection or a welded connection or by crimping.

The connecting piece 550 is connected to an abutting element 551, preferably formed integrally with the abutting element 551, which has a through-opening 553 (without an internal thread), through which a fastening element 552 in the form of a screw is guided. The fastening element 552 extends through the through-opening 553 and is screwed into a thread on the contact body 54A, which thread is preferably formed in the core 540).

By means of the fastening element 552, the connecting element 55A and, via it, the load line 53A are thus mechanically fastened to the contact body 54A and are also electrically contacted with the contact body 54A by the abutting element 551 abutting on the cladding layer 541.

The connection points of the plug-in contact 51A and the connecting element 55A are spatially spaced from one another in that the plug-in contact 51A and the fastening element 552 are attached to the contact body 54A at different heights (as viewed perpendicularly to the insertion direction E corresponding to the longitudinal extension direction of the plug-in contact 51A). In this way, it is ensured that a current flow between the load line 53A and the associated plug-in contact 51A always flows via the contact body 54A and that heat can thus be absorbed at the contact body 54A.

As can be seen in FIG. 5, the contact bodies 54A, 54B are fixed together with the plug-in contacts 51A, 51B within the housing 50 of the plug-in connector part 5. The contact bodies 54A, 54B can be mechanically fixed within the housing 50 and carry the plug-in contacts 51A, 51B so that the plug-in contacts 51A, 51B are held in position on the plug-in portion 501 by the contact bodies 54A, 54B.

Another exemplary embodiment shown in FIG. 12-15 differs from the exemplary embodiment according to FIG. 8-11 only in that the materially bonded connection 513 is not formed as a circumferential material ring between the contact portion 510 and the cladding layer 541 (as in the exemplary embodiment according to FIG. 8-11), but individual material connection points, for example weld points or soldering points, are created, which connect the contact portion 510 in a materially bonded manner to the cladding layer 541 in places.

Figure 16:
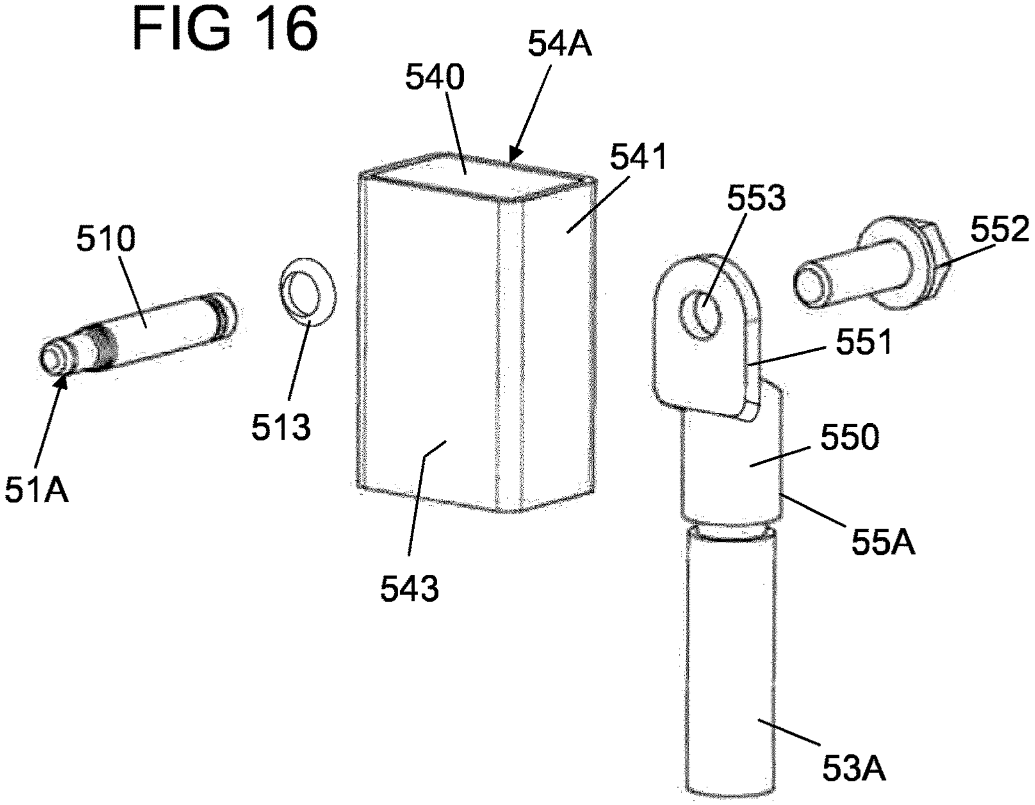
FIG. 16 is an exploded view of yet another exemplary embodiment of a plug-in contact with a contact body and a connecting element for connecting a load line.
Figure 17:
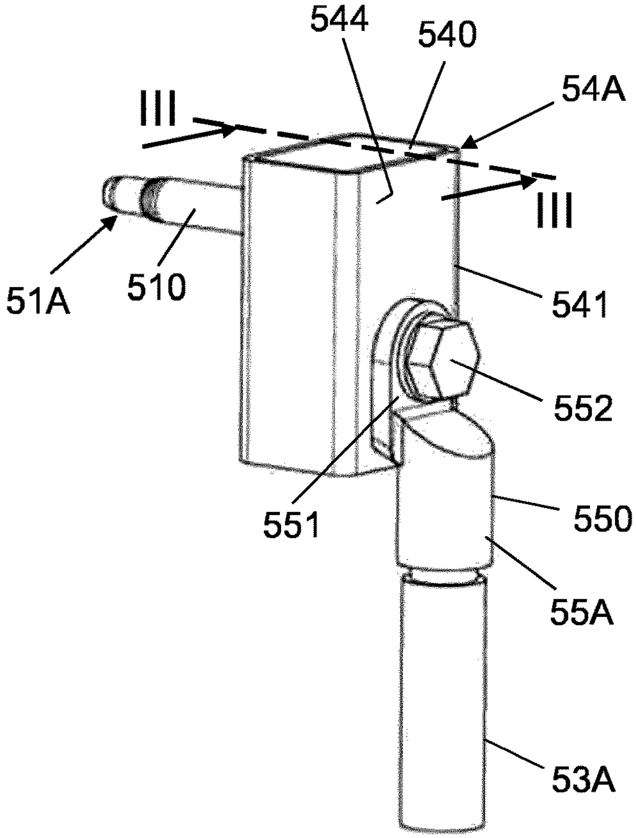
FIG. 17 shows the plug-in contact, the contact body and the connecting element in the assembled position.
Figure 18:
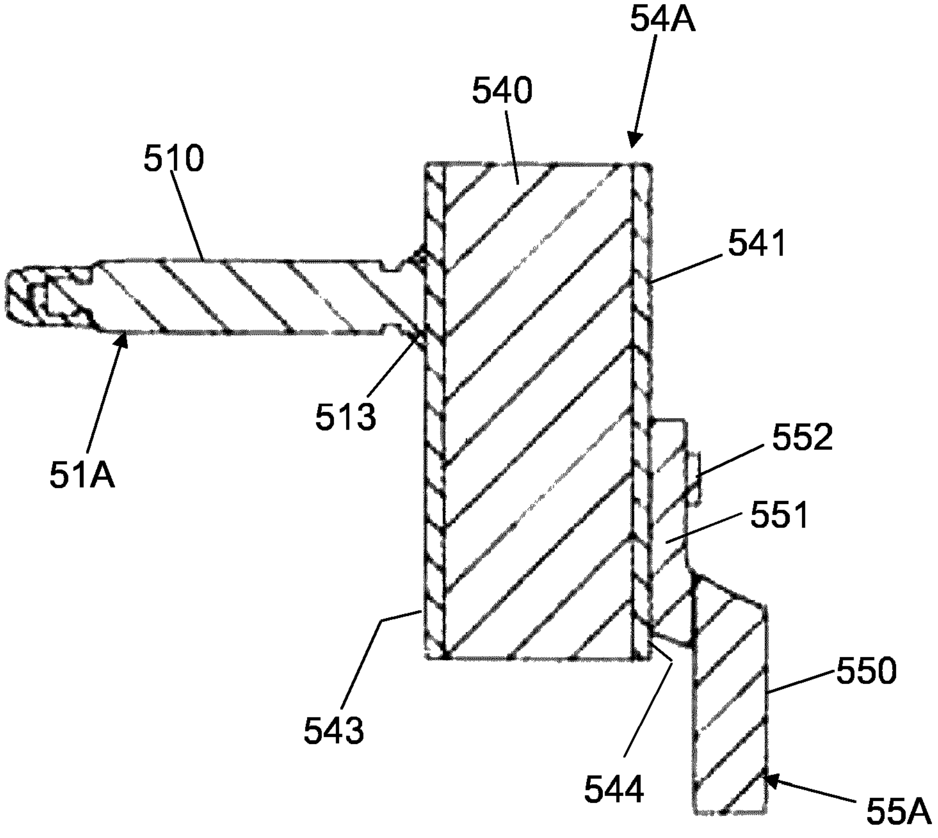
FIG. 18 is a sectional view along the line III-III according to FIG. 17.

In yet another exemplary embodiment shown in FIG. 16-18, the plug-in contact 51A is connected to the associated contact body 54A exclusively in a materially bonded manner. In contrast, there is no positive connection between the plug-in contact 51A and the contact body 54A. The materially bonded connection 513 is here formed by a circumferential, closed material ring, which connects the contact portion 510 to the cladding layer 541 of the contact body 54A. The contact portion 510 is butt-fitted to the front side 543 of the cladding layer 541 and is connected to the contact body 54A via the material connection 513. The material connection 513 on the one hand establishes a mechanical fastening for the plug-in contact 51A and on the other hand minimizes the electrical transition resistance.

Apart from the fastening of the plug-in contact 51A to the associated contact body 54A, the exemplary embodiments according to FIGS. 12-15 and 16-18 are identical to the exemplary embodiment according to FIG. 8-11 so that reference is additionally made to the explanations regarding this exemplary embodiment.

The idea forming the basis of the invention is not limited to the exemplary embodiments described in the preceding, but can also be realized in another way.

The contact body is formed from different materials, wherein at least portions of the core are surrounded by a cladding layer. The core is formed from a first material, which preferably has good electrical conductivity and also a high specific heat capacity. In contrast, the cladding layer is formed from a second material, which has very good electrical conductivity and makes simple, reliable electrical contact on the outside with the plug-in contact and the connecting element possible.

The contact body may have a cuboid shape, as in the exemplary embodiments shown. However, this is not limiting. The contact body may also have a different shape, for example a cylindrical shape.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Charging station
2 Charging cable
200, 201 End
3 Charging plug
30 Housing
300, 301 Plug section
31 Mating contact element
4 Vehicle
5 Charging socket
50 Housing
500, 501 Plug-in portion (receiving socket)
502 Rear cover
51A, 51B Plug-in contact
510 Contact portion
511 Shaft portion
512 End
513 Material connection
52 Contact elements
53A, 53B Load line
54A, 54B Contact body
540 Core
541 Cladding layer
542 Opening
543, 544 Side
55A, 55B Connecting element (cable lug)
550 Connecting piece
551 Abutting element
552 Fastening element
553 Through-opening
E Insertion direction

The invention claimed is:

1. A plug-in connector part for a charging system for charging an electric vehicle, the plug-in connector part comprising:

a plug-in portion for plug-in connection to a mating plug-in connector part;

at least one plug-in contact, arranged on the plug-in portion, for electrical contact with a mating contact element of the mating plug-in connector part;

a connecting element configured to connect an electrical load line to the at least one plug-in contact; and a contact body to which the at least one plug-in contact and the connecting element are connected, the contact body being configured to transmit a current between the connecting element and the at least one plug-in contact, wherein the contact body has a core comprising a first electrically conductive material and a cladding layer which covers at least portions of the core and comprises a second electrically conductive material that is different than the first electrically conductive material.

2. The plug-in connector part of claim 1, wherein the first electrically conductive material comprises an aluminum material.

3. The plug-in connector part of claim 1, wherein the second electrically conductive material comprises a copper material.

4. The plug-in connector part of claim 1, wherein the core is roll-plated with the cladding layer.

5. The plug-in connector part of claim 1, wherein the connecting element comprises an abutting element, which abuts flatly on the cladding layer.

6. The plug-in connector part of claim 1, wherein the connecting element comprises a fastening element configured to establish a connection between the connecting element and the contact body.

7. The plug-in connector part of claim 1, wherein the at least one plug-in contact is connected to the contact body via a positive connection and/or a material connection.

8. The plug-in connector part of claim 1, wherein the at least one plug-in contact comprises a contact portion configured to establish an electrically contacting plug-in connection to the mating contact element.

9. The plug-in connector part of claim 8, wherein the contact portion is arranged on a first side of the contact body and the connecting element is arranged on a second side of the contact body that faces away from the first side.

10. The plug-in connector part of claim 9, wherein the contact portion extends perpendicularly from the first side.

11. The plug-in connector part of claim 8, wherein the at least one plug-in contact comprises a shaft portion which adjoins the contact portion and is inserted into an opening of the contact body.

12. The plug-in connector part of claim 11, wherein the opening comprises a through-opening extending through the contact body.

13. The plug-in connector part of claim 12, wherein an end of the shaft portion that is remote from the contact portion projects from the contact body.

14. The plug-in connector part of claim 13, wherein a rivet connection is established at an end of the shaft portion.

15. The plug-in connector part of claims claim 8, wherein the contact portion is butt-fitted to the contact body and is connected to the contact body via a material connection.

16. A charging system for charging an electric vehicle, comprising:

the plug-in connector part of claim 1.

17. The charging system of claim 16, wherein the plug-in connector part comprises a charging socket arranged on the electric vehicle.

* * * * *